United States Patent Office

3,316,947
Patented May 2, 1967

3,316,947
MACHINE SYSTEMS ENLARGEABLE ACCORDING TO THE PRINCIPLE OF UNIT CONSTRUCTION
Eyvind Lyche, Goteborg, and Gunnar Lennart Wiknas, Jonsered, Sweden, assignors to Jonsereds Fabrikers Aktiebolag, Jonsered, Sweden, a corporation of Sweden
Filed Jan. 26, 1965, Ser. No. 428,038
Claims priority, application, Sweden, Oct. 24, 1964, 12,837/64
11 Claims. (Cl. 144—1)

ABSTRACT OF THE DISCLOSURE

A system of operating and work units for performing different operations in which the units are power driven and have mutually identical input and output means whereby a plurality of the units may be assembled together to produce a complex production line.

---

The present invention relates to a working machine system comprising at least one working unit for performing machining operations upon workpieces and at least one operating unit for respectively feeding said workpieces to and discharging them from the working unit, said units having frame means supporting power-driven means and operating means driven by said power means, said units having mutually identical input and output sides and being arranged for assembling one with the other like the elements of a construction set into large or small working machines or machine systems including various numbers of units.

The object aimed at and realized by the present invention is to satisfy a great many varying desiderata and tasks with but two different types of machine units, a working unit proper and an operating unit, in order to reduce the costs for both the manufacturer and the buyer through a rationalized manufacture of working machines and to give the buyer better possibilities of economically enlarging his machine stock or altering the production whenever he so desires after installing a machine system constructed in accordance with the invention.

According to the invention, each machine unit is an independent unit having its own frame which consists of two box-shaped side frames preferably designed as cabinets and which are interconnected transversely of the unit with the aid of connecting elements and so arranged that an optional number of working and/or operating units can be assembled and interlocked end to end.

According to the invention, the working units have the same basic construction irrespective of the working operation for which they are intended, and the required variation is obtained by furnishing the units with special tools such as saws, milling cutters, polishing, buffing or grinding tools, surface coating and painting means, brush rollers etc. The operating units likewise have the same relative basic construction and are preferably also equipped in the same way, i.e. with feeding means of the same kind irrespectively of whether they constitute the feed units or the delivery units.

In a preferred embodiment of the invention each operating unit in per se known manner may thus comprise a feed device such as rolls, rollers, chain, or belt conveyors and the like, as well as a device for pressing workpieces fed through the unit against the feed device, and according to the invention the pressing device thereby includes at least one row of pressure rollers carried by adjustable arms in the frame, in which arms said rollers are mounted in the manner of casters to press the workpieces against the feed device without any tendency of oblique feed. It is also possible to provide the casters so that material can be supplied to an optional end of the unit.

Besides the basic construction of each operating unit may be in general conformity with that of each working unit.

Each operating unit is designed so that it can be connected to a working unit or another operating unit ahead of just as well as behind said unit, i.e. it can function as a feed unit or as a delivery unit and it may even be reversible, i.e. adapted to be interconnected with a working unit or another operating unit, with any side whatever as the front and back, respectively. Also the working units may be adapted for interconnection in the same way as they permit connection with the operating units. A further possibility is to superimpose working units and feed units for parallel operation or to place one or more units in inverted position, i.e. upside down.

These arrangements provide ample opportunities to satisfy a wide range of requirements by simple variations.

To ensure a synchronous feed of workpieces by means of several operating units functioning as feed and/or delivery units said operating units are equipped for their operation with identical, preferably positively driven transmissions and said transmissions are adapted for interconnection, either directly or via an intermediary working unit or units for synchronous operation.

In a particularly practical and simple construction of the frame of the units the side frames thereof are interconnected by means of three parallel interconnecting elements of such relative location that the elements lie at the corners of a substantially isosceles triangle the apex of which is directed upwardly and the basis of which is parallel with the horizontal plane.

This arrangement permits a simple, rigid connection of the side frames of the units, gives an ample space between said side frames for mounting tools, drives and transmissions, and ensures the possibility of adapting the width of the unit in a simple manner to prevailing requirements by selection of the desired length of the connecting elements. Said elements may be solid beams or shafts but preferably have the form of strong tubes.

The design of the side frames of the units as cabinets will give practical spaces for accommodating shaft bearings, certain transmission elements and drive means, adjusting means for bearings or tools, electrical or other coupling means, components of automatic mechanisms etc.

These and further features of the invention will become apparent from the following description in which reference is made to the accompanying drawings in which.

Figure 1:
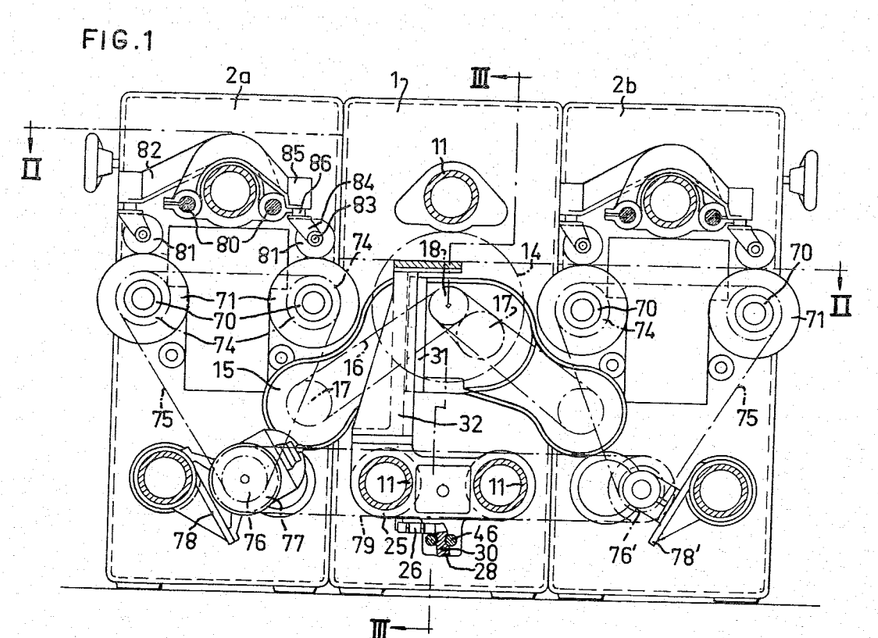
FIG. 1 is a vertical cross section of a machine according to the invention composed of two operating units and an intermediary working unit and serving for longitudinal sawing and edging of boards.
Figure 2:
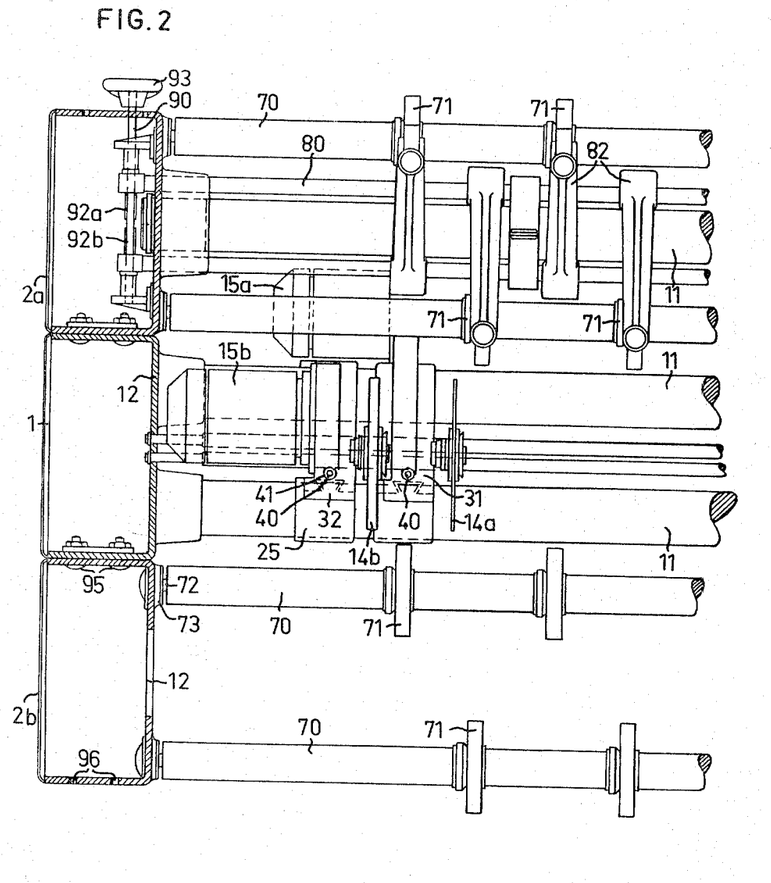
FIG. 2 is a horizontal section of the machine on line II—II in FIG. 1.
Figure 3:
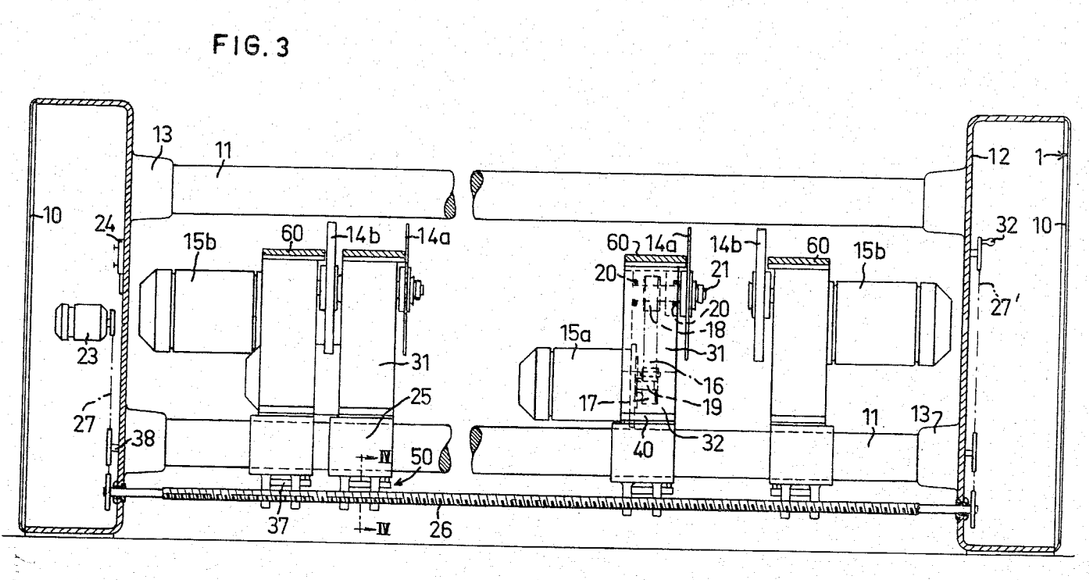
FIG. 3 is a vertical section of the working unit in the machine of FIGS. 1 and 2 on line III—III in FIG. 1.

The machine system shown in FIGS. 1–3, which is for longitudinal sawing or dividing and edging or trimming of boards, comprises a working unit 1 and two operating units 2a, 2b which are placed on either side of the working unit 1 to form a feed unit 2a and a delivery unit 2b, respectively. In the embodiment shown the two operating or feed units, 2a and 2b are of exactly the same construction and the input and output sides of the unit are identical so that the units may change places or be turned. To permit such a shifting of the feed units without changing their feed properties the feeding means of the feed units are designed according to the invention in a special way which will be described more in detail later. First, however, there follows a detailed description of the working unit 1 in FIGS. 1–3.

The working unit 1 has a frame which consists of two structurally alike side frames 10 which are interconnected by means of three strong, horizontally transverse and parallel tubes 11. These tubes have such a relative location that a plane perpendicular to the tubes intersects the longitudinal axes of the tubes at points lying at the corners of an isosceles triangle, which has its apex positioned at the top and its basis parallel with the horizontal plane. The side frames substantially are of right-angular parallelepipedical shape and are in the form of cabinets, the frame tubes 11 being connected with the inner frame walls 12 by means of sleeve-shaped end connections 13. Otherwise the frame cabinets 10 like other prior-art machines may contain operating equipment, drive means etc.

In the machine system illustrated in FIGS. 1–3 the working unit is provided with four tools 14 adjustable transversely of the machine and in vertical direction as well. The two inner tools may be customary circular saws 14a for longitudinal sawing and dividing the workpieces longitudinally, while the two outer tools may be cutting saws 14b for cutting straight or trimming the edges of the workpieces during the feed through the working unit 1. Each saw 14a, b is driven by an electric motor 15a, 15b of its own over an associated transmission, for instance—as shown most clearly in FIG. 3 for one longitudinal saw 14a—a belt 16 passing over pulleys 17, 18 on the motor shaft and respectively the saw shaft 21 mounted in two bearings 20.

Figure 4:
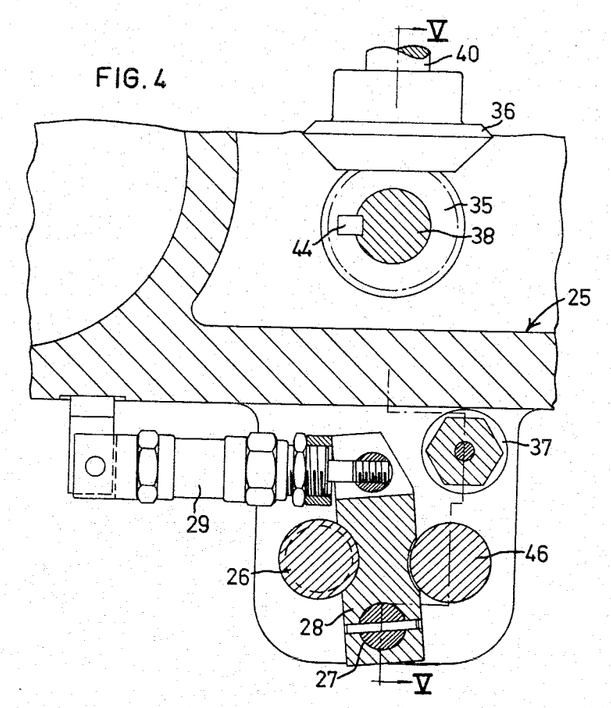
FIG. 4 is a fragmentary view of the device for transversely adjusting the tools on a larger scale and in section on line IV—IV in FIG. 3.
Figure 5:
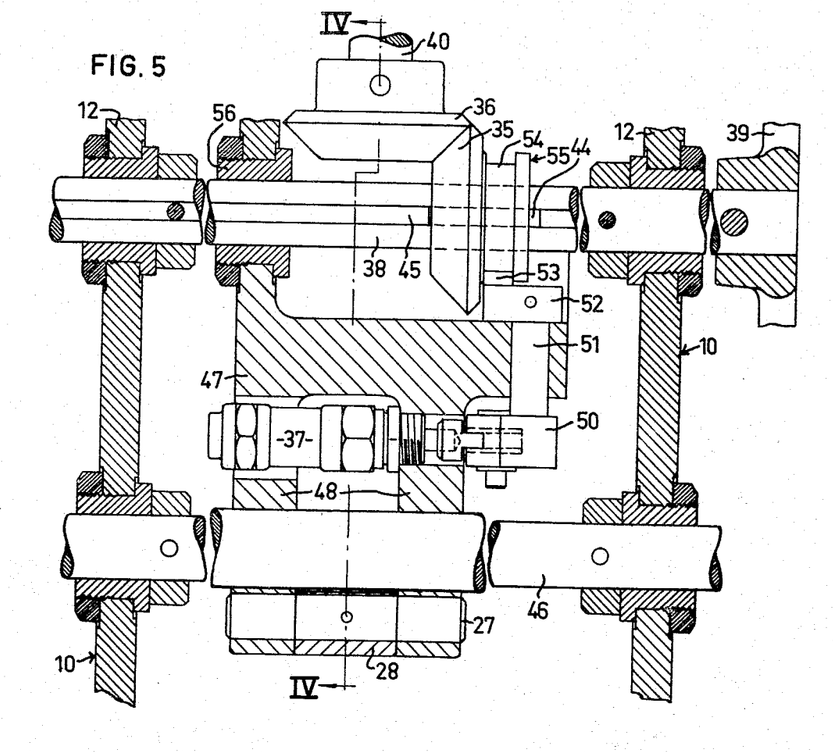
FIG. 5 is a view similar to FIG. 4 of the device for vertically adjusting the tools and in section on line V—V in FIG. 4.

Each saw 14 and the drive 15 thereof are supported by a holder 25 on one of the two lower frame tubes in such a way that the holder is axially movable on said tube and guided by the other tube. The saws 14 are adjustable transversely of the machine individually, group-wise or collectively by means of a transverse-adjusting device including a threaded spindle 26 extending between the side frames 10, said spindle being rotatable by a suitable servomotor, for instance an electric motor 23 (FIG. 3) placed in one frame cabinet 10, through a chain transmission generally designated 30 and a key or half nut 28 which has its lower end pivoted to the holder 25 by means of a strong pivot 27. The key or half nut 28 has its upper end connected to the piston of an air cylinder 29 which is connected to a suitable source of compressed air (not shown) through an operating valve, e.g. valve 24 (FIG. 3), placed in one frame cabinet 10. FIG. 5 shows the half nut 28 swung about its pivot 27 into engagement with the threaded spindle 26 for moving the holder 25 including the saw 14 and motor 15 along one of the lower frame tubes 11.

Furthermore, each saw 14 has its motor 15 connected to the corresponding holder 25 by a vertically adjustable slide 31 which is guided on a vertical part 32 of the holder and can be operated by means of a height adjusting mechanism similar to the device 26–30 described for the transverse adjustment of the saws but including instead of the screw and nut arrangement 26, 28 a bevel gearing the gears 35, 36 (teeth not shown) of which may be engaged and disengaged with the aid of an air cylinder 37. Extending parallel with and obliquely above the threaded spindle 26 is a shaft 38 mounted in the inner walls 12 of the opposed frame cabinets 10, and like the spindle 26 said shaft 38 can be rotated by a servomotor 23 through a chain transmission 27 or manually with the aid of a handwheel 39 by which the transverse adjusting mechanism 26–30 also can be operated. The motor of the transverse adjusting mechanism can be used as a drive motor for the above-described height adjusting mechanism.

Each holder 25 supports a vertical spindle 40 which has its threaded end portion engaging a nut 41 secured to the slide 31 and supporting at its lower end one bevel gear 35 of the bevel gearing 35, 36. Four bevel gears 36, one for each of the saws 14, are carried by the horizontal shaft 38 and each of these bevel gears is arranged always to follow one of the bevel gears 35 of the four holders 25. The bevel gears 36 can be selectively engaged with and disengaged from said gears 25 for individual, group-wise or collective height adjustment of the saws 14.

For this purpose the bevel gears 36 are axially movably carried by the horizontal shaft 38, rotation of said gears relative to the shaft 38 being prevented by means of a key 44 secured to each bevel gear 36 and engaging a keyway 45 in the shaft 38. Extending parallel with and horizontally adjacent the threaded spindle 26 is a rod 46 serving as an abutment for the half nut, and like the spindle 26 said rod 46 is passed through a fork-shaped holder 47 which is freely movable on said parts and between the two limbs 48 of which the half nut 28 is rotatable on its pivot 27. The height adjustment air cylinder 37 is mounted on one limb 48 of the holder 47 and its piston rod is connected with a bell crank lever 50 which has one shaft portion 51 mounted in the holder 47 and carries a cross member 52 having a pin 53 engaged in a groove 54 between two flanges of a sleeve 55 with which is connected the bevel gear 36 axially movable on the horizontal shaft 38. The holder 47 through which the two shafts 48 and 46 extend and in which the last-mentioned shaft is mounted with the aid of a bearing 56, is connected with the saw holder 25 and is movably guided together with it on the rod 46. When the saw holder 25 is shifted by means of the threaded spindle 26 thus both the air cylinder 29 for operating the half nut 28 and the air cylinder 37 as well as the holder 47 thereof, operating lever 50 and bevel gears 35, 36 are moved. The air cylinder 37 is connected to the same source of compressed air as the air cylinder 29, and like this latter cylinder it is mounted via an operating valve 24 in one frame cabinet 10, there being an equally large number of operating valves 24 as air cylinders 29, 37 to permit engagement of one or more bevel gears 35 with the corresponding bevel gears 36 in the respective gearing or half nuts 28 for the height and transverse adjusting mechanisms, respectively, of the saws 14. Upon rotation of the shaft 38 in one or the other direction by the servomotor 23 via the transmission 27 or manually with the aid of the handwheel 39 via the transmission 37' the corresponding threaded vertical shafts 40 are thus rotated through the engaged gearings 35, 36 to raise or lower the corresponding slide 31.

With the adjusting mechanisms described in the foregoing it is thus possible selectively to move each tool or group of tools in the transverse direction of the machine as well as in the vertical direction thereof for working, i.e. sawing, of workpieces advanced through the working machine 1 on tables 60, such as wood fibre boards, veneer boards or the like, or for withdrawing one or more tools when others are to work, as is described with reference to FIGS. 6–9 in the following. Naturally, the saws 14 are readily replaced by other rotating working tools, such as milling cutters, etc. Of course, also the number of tools can be varied and in certain cases brought to coact for instance with such working tools as brush rollers for the surface treatment of lacquered boards or like. In that case the height adjusting mechanism can be used to raise and lower the bearings of a shaft carrying one or more tools.

As already mentioned, the two operating units 2a, 2b are substantially exactly identical, for which reason the following description of the feed unit 2a placed ahead of the working unit 1 as seen in the direction of feed may be considered applicable also to the other operating unit 2b.

Like the frame of the working unit 1, the frame of feed unit 2a consists of two mutually alike side frames 10 and three strong transverse tubes 11 which are of the same construction, relative arrangment and size as the corresponding parts of the working unit 1. For feeding workpieces into the working unit 1 the feed unit 2a has a feed mechanism comprising two feed rolls or shafts 70 which are provided with a number of short roll shell sections formed as flanges or preferably a number of mounted feed rollers 71 which may be knurled and are placed in parallel in the same horizontal plane on either side of the vertical median axis of the unit 2a at a distance beneath the upper frame tube 11. The arrangement including mountable rollers 71 is preferred as it permits a wider choice of shaft lengths and an easy mounting of the number of rollers required according to the desired length of the shafts 70. With the use of shafts 70 the transmission for the shaft can be chosen at will. Also, a shaft 70 having rollers 71 is not so expensive as a complete roll. Each of the shafts 70 has its ends (which are in the form of journals 72) mounted for rotation in bearings 73 on the inner walls of the side frames 10 and each carry a gear 74. A drive chain 75 passes over said gear 74 and also over a gear 76 on the drive shaft of an electric motor 77 (the gears and chains are shown diagrammatically). The motor 77 is placed on a bracket 78 which is mounted on one of the lower frame tubes 11.

The arrangement of the two shafts 70 in the other operating unit or delivery unit 2b at the delivery end of working unit 1 is the same as the one described above, which also applies to the transmission for driving the feed rolls 71, with the difference, however, that it is not driven by an electric motor of its own but passes over a gear 76' mounted on a bracket 78' on one of the lower frame tubes 11. Instead, the motor 77 of the feed unit 2a is utilized to drive the delivery unit 2b, and over a positively acting transmission, such as a chain and sprocket wheel transmission 79, said motor 77 also drives the transmission of the delivery unit 2b and thereby the shaft 70 thereof, whereby a synchronous drive of the two operating units 2a, 2b is guaranteed.

The feed rolls 71 can be replaced by another equivalent feed mechanism of any known type (not shown) such as a belt, band or chain conveyor running over two shafts or over for instance the rolls 71.

As is best shown in FIG. 1, two rods 80 extend on either side on the upper frame tube 11 and these rods 80 have their ends rotatably mounted and preferably vertically adjustable in the inner walls 12 of the side frames 10. The rods 80 each carry a number of pressure rollers 81 corresponding to the number of feed rollers 71 on each shaft 70 and serving to press the workpieces against the feed rollers. The pressure rollers 81 are carried on the respective rod 80 by bent arms 82 which are non-rotatably and non-displaceably clamped to the rods and extend over the upper frame tube 11. Every second arm 82 extends rearwardly from one rod 80 at the entrance end of the feed unit 2a and every second arm extends forwardly from the other rod 80 over the upper frame tube 11 to a position above the respective one of the feed rollers 71 which are relatively staggered accordingly on their shafts 70. The pressure rollers 81 are rotatable on shafts 83 which are mounted on fork-shaped holders 84 and said holders in turn are mounted for pivotment about pivots 85 on bearings housings 86 at the outer ends of the arms 82. The pressure rollers can thus swing about vertical shafts in the manner of casters in order always automatically to adjust themselves after the advanced workpieces. The load pressure exerted by the pressure rollers on a workpiece advanced on the feed rollers 71 can be regulated by means of load springs (not shown) acting on the rods 80 or mounted in the bearing housings 86 for the vertical journals 85 of the casters. It is furthermore possible to regulate the application pressure of the pressure rollers 81 with the aid of the rods 80 which are adjustable by means of an adjusting mechanism consisting of a shaft 90 mounted in brackets 91 on the inner wall 12 of one side frame 10 and provided with two worm screw sections 92a, 92b in order via worm wheels on worm wheel sectors at the ends of the rods to turn the rod ends in one or the other sense for increasing or diminishing the bias. The shaft 90 extends to the outer side of the side frame 10 and carries a handwheel 93 by which it can be turned.

An extraordinarily good guidance of the workpieces is obtained due to the pressure rollers 81 coacting with the feed rollers being arranged in the manner of casters. Any tendency of workpieces being guided laterally, for instance because of obliquity or other defects of the workpieces is entirely eliminated, and workpieces initially supplied in an oblique position are directed into correct position by the endeavour of the pressure rollers to adjust themselves into correct position should they have taken an oblique position.

In the preferred embodiment shown of the side frames 10, the interconnection of the units may be realized by means of bolts 95 passing through holes 96 in the end walls of the side frames.

Figure 6:
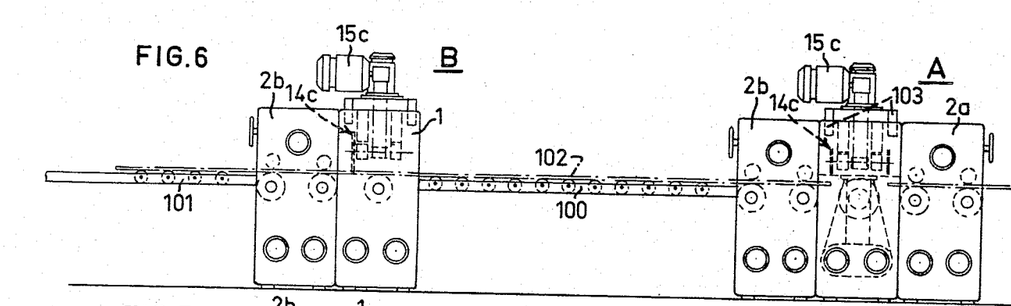
FIGS. 6 and 7 are a diagrammatic side elevation and plan view, respectively, of a machine system according to the invention for squaring and dividing boards.
Figure 7:
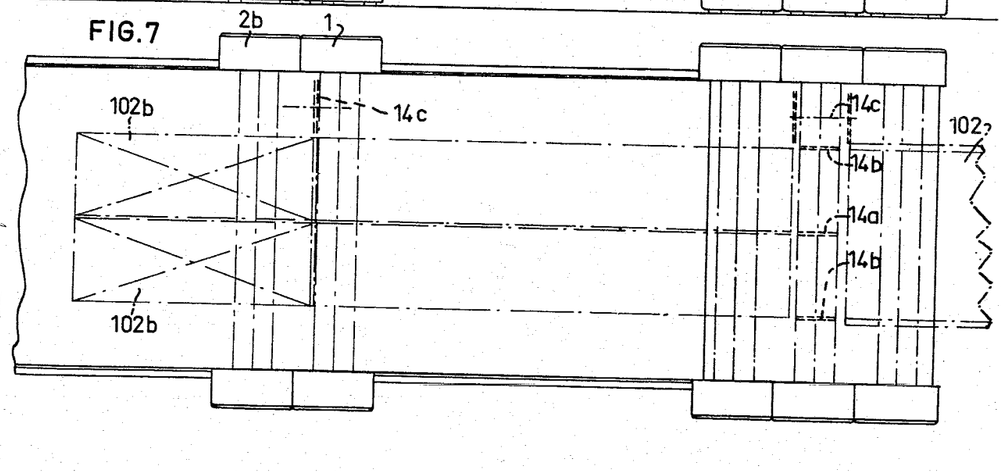

FIGS. 6 and 7 show an example of an arrangement of machine units according to the invention for dividing and square sawing of boards. Use is made here of a machine group A comprising a working unit 1 and two operating units placed on either side thereof as a feed unit 2a and a delivery unit 2b, respectively, and a machine group B comprising a working unit 1 and an operating unit placed as a delivery unit 2b. Interposed between the first machine group A comprising the machine units 2–1–2 and the second machine group B comprising the machine units 1–2 is a roller table 100 for supporting the boards during the transport from A to B, and beyond the machine group B there follows a similar roller table 101 for forwarding the boards.

In machine group A the working unit 1 is equipped with two edging or trimming saws 14b and a longitudinal saw 14a for edging and dividing workpieces in the form of plane boards 102 supplied by the feed unit 2a. For simultaneously straightening the rear end of a board 102 that has already been cut in the machine and sawn along the lateral edges, and the front end of a board 102 just supplied, machine group A is equipped with a cross cutting assembly 14c comprising two transverse, parallel and slightly spaced circular saws and an electric drive motor 15c common to the saws. The cross cutting assembly 14c is supported for reciprocating movement on two parallel beams 103 mounted on the side frames and is adapted to be reciprocated by means of a drive which can be of the same design as that of the drive 26–29 (described already with reference to FIG. 4) for the transverse adjustment of the saws 14a, 14b. Besides the saw assembly 14c may be equipped with a device 35–40 of the type described with reference to FIG. 4 and serving for the vertical adjustment of the saws.

With such an arrangement of the cross cutting assembly equipped with two circular saws, two sawing operations are effected during one and the same saw travel, i.e. one working operation is saved.

The working unit 1 of machine group B includes a cross cutting assembly 14c of the type described above but having but one circular saw for cutting the advanced, longitudinally cut boards 102b to the correct length.

The working operations of the machine system A–B or 2-1-2-1-2 shown in FIGS. 6 and 7 are controlled by abutments and limit switches and if desired photo cells which in a manner known per se in mechanical engineering are actuated by the boards 102 or by the movements of the tools in order over an electric control system (not shown) to operate the various drive means so that the feed of the boards 100 is stopped and the longitudinal saws 14a, 14b are moved aside when the cross cutting assembly 14c is started. The longitudinal saws in machine group A may be arranged to be lowered automatically by the height adjustment mechanism described so that they do not obstruct the operation of the cross cutting assembly 14c when this is started. However, in the preferred embodiment the longitudinal saws 14a, 14b are stationary vertically and the circular saws of the cross cutting assembly 14c are placed at such a mutual distance that at the cross cutting the longitudinal saws lie free in the gap between the ends of two adjoining boards 100. This will prevent the occurrence of damages to the longitudinal edges of the boards 100 from the longitudinal saws 14a, b which do not touch the boards during the cross cutting operation. The cross cutting assembly 14c may be arranged to be raised before its return to the initial position so that it is moved out of the path of the longitudinal saws and so that the latter can immediately take up the longitudinal sawing again. A preferred embodiment hereof is described in the following with reference to FIG. 10.

Figure 8:
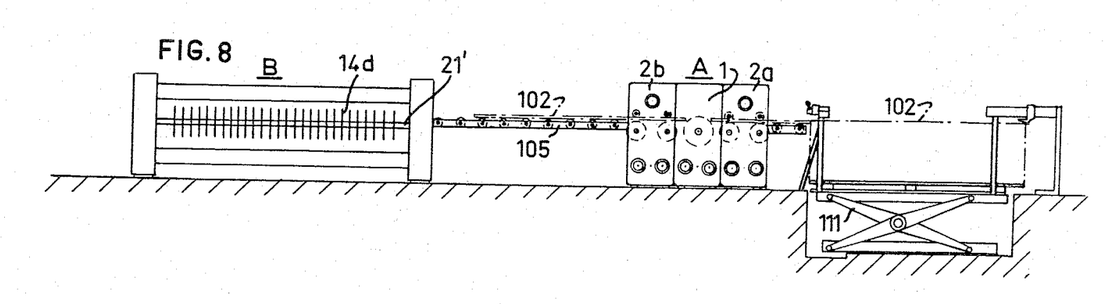
FIGS. 8 and 9 are a diagrammatic side elevation and plan view, respectively, of another machine system according to the invention for making tile-imitation boards.
Figure 9:
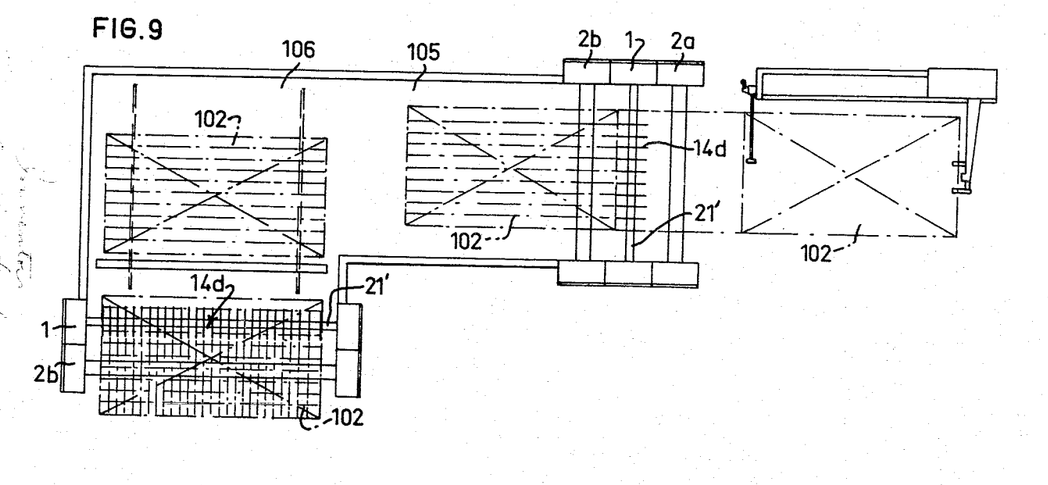

FIGS. 8 and 9 schematically show a machine system for the manufacture of tile-imitation boards. Machine group A comprises the combination 2-1-2, viz a working unit 1 preceded by a feed unit 2a and followed by a delivery unit 2b, while machine group B comprises the combination 1-2 viz a working unit 1 followed by a delivery unit 2b. Machine Group B is placed after and makes a right angle with machine group A. Between these two groups the boards 102 are advanced on a roller conveyor 105 which conveys the boards in the same direction as the feed and delivery units in machine Group A, and a cross feeding conveyor 106 which at the end of the roller conveyor 105 takes over the boards and moves them at right angles to the first feed direction to machine group B from where the boards are delivered by the delivery unit 2b.

The working unit 1 in machine group A as working tools has a series of parallel groove milling cutters 14d which are disposed on one and the same shaft 21'. This shaft may be mounted in the side frames 10 and arranged to be driven by a motor (not shown) which is mounted on the working unit 1 in substantially the same manner as is the motor 77 (FIGS. 1–3) on the feed unit 2a for operation of the feed rolls of the two operating units 2a and 2b. The groove milling cutters 14d cut straight longitudinal parallel grooves in the boards 102 which are automatically advanced from a stack of boards 110 on a feed table 111 in step with the working effected in machine groups A and B. The working unit 1 in machine group A may be equipped with edging saws, e.g. saws 14b in FIGS. 1–3, and may also be equipped with a cross cutting assembly, such as the assembly 14c in FIGS 6 and 7. The working unit 1 in machine group B is equipped with the same working tools 14d as the unit 1 in machine group A for milling transverse grooves in the boards 102 so that these will present a square groove pattern when delivered from the delivery unit 2b.

The above described units can be used in other machine systems in any desired relative setting, and the working units may be used separately, in combination with one another and/or in combination with operating units. The working tools can be fitted and driven in various ways. With for instance a working unit equipped with brush rollers these are suitably arranged to be driven directly by electric motors placed on side frames 10 opposite the end bearings of the brush rollers.

Figure 10:
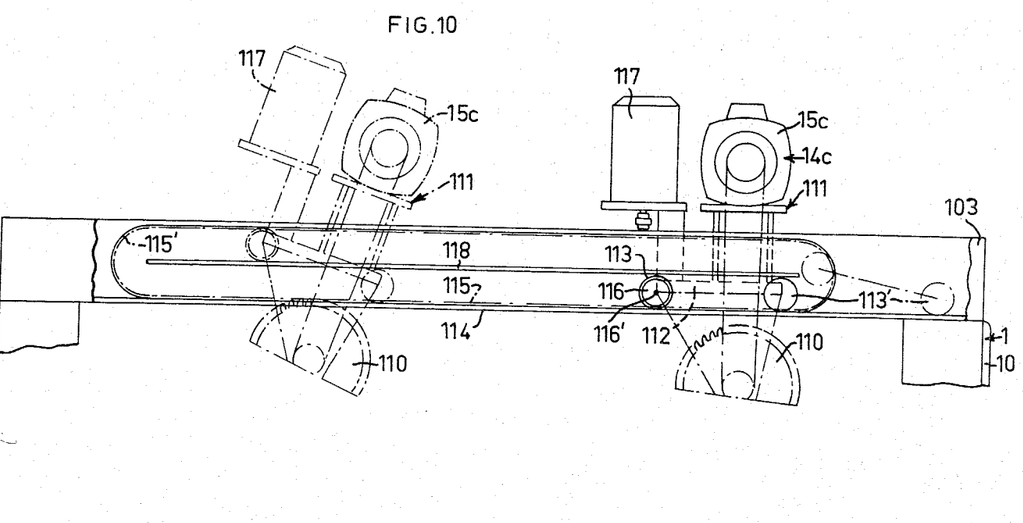
FIG. 10 is a diagrammatic side elevation of a cross cutting unit including drive and guide means.

FIG. 10 diagrammatically shows a side elevation of a mechanism for driving and controlling a cross cutting assembly 14c which is used in the working unit 1 in machine group A (FIG. 6). The two parallel circular saws 110 are driven by the same motor 15c and are mounted on the same shaft which is mounted in a frame generally designated 111 and supported by a carriage 112. This carriage has two wheel pairs 113, 113' which are adapted, during the working travel of the assembly 14c for cross cutting, to run on horizontal guides 114 on the cross beams 103. For reciprocating the carriage 112 use is made of a chain and sprocket transmission consisting of an endless stationary chain 115 and a sprocket wheel 116 (teeth not shown) which is mounted on the front wheel axle 116' of the carriage 112 and is adapted to be driven by an electric drive motor 117 on the assembly 14c. The stationary chain 115 extends along one of the two cross beams 103 with straight horizontal runs the lower run of which merges through a circularly curved portion 115' in the upper run at the ends of the chain transmission. A straight horizontal guide 118 is located midway between the two chain runs. The guide 118 and the front wheel pair 113 of the carriage 112 are arranged so that the carriage driven by the motor 117 at the end of the working travel of the cross cutting assembly 14c is rearwardly inclined due to the sprocket wheel 116 traveling upwardly along the circularly curved vertical transition of the chain 115, as is shown by broken lines in the left-hand portion of FIG. 10, and when the carriage starts its return movement the front wheel pair 113 engages the guide 118 located between the chain runs, thus retaining the carriage in the rearwardly inclined position so that during the return travel the circular saws do not obstruct the continued advance of the boards after the interruption during the cross cutting operation.

At the end of the return travel the carriage is again tilted into horizontal position due to the sprocket wheel travelling downwardly along the rounded transistion from the upper to the lower chain run, the rear wheel pair occupying the position shown in the right-hand portion of FIG. 10.

It is of course possible to employ a chain and sprocket transmission at each cross beam 103, if desired, Furthermore, it is possible to substitute a rack and gear transmission for said chain and sprocket transmission, but in most cases the latter mechanism is the simplest and cheapest one.

The machine system according to the present invention provides ample opportunities of varying working programs in a simple way by various combinations of machine units of but two different kinds and by selecting the tool equipment of the working units. Due to the working units having the same basic construction as the operating units the manufacture of the machines is simplified and rendered cheaper, and maintenance costs as well as the costs for any desired enlargement during operation are reduced. The planning and provision of program control for various working programs are highly facilitated by the simplified design of the working and operating units according to the invention to form more or less complicated machine systems.

What we claim and desire to secure by Letters Patent is:

1. A working machine system comprising at least one working unit for performing machining operations upon workpieces and at least one operating unit for respectively feeding said workpieces to and discharging them from the working unit, said units having frame means supporting power-driven means and operating means driven by said power means, said units having mutually identical input and output sides and being arranged for assembling one with the other like the elements of a construction set into large or small working machines or machine systems including various numbers of units.

2. A machine system as claimed in claim 1, wherein the frame for each machine unit is an independent frame consisting of a pair of box-shaped side frames which are interconnected by connecting elements and which are adapted to permit assembling several frames with the side frames end-to-end and equipped with devices for connecting the frames together.

3. A machine system as claimed in claim 2, wherein the side frames of each machine unit are interconnected in the transverse direction of the unit by means of three horizontal parallel connecting elements in such a relative arrangement that they lie at the apices of an isosceles triangle the base of which is parallel with the horizontal plane.

4. A machine system as claimed in claim 1, wherein each operating unit includes a feed mechanism having feeding means such as rollers, rolls, chain or belt conveyors and the like and means for pressing workpieces advanced through the unit against the feed mechanism, said means for pressing the workpieces against the feed mechanism including at least one row of pressure rollers carried by arms which are mounted in the frame and in which said pressure rollers are rotatably and pivotally mounted in the manner of casters.

5. A machine system as claimed in claim 4, wherein the pressure rollers are yieldably biased in a direction toward said feeding means by a regulatable biasing mechanism.

6. A machine system as claimed in claim 1 including at least two feed units for each working unit, wherein the feed units are provided with identical transmissions for driving said feed mechanisms and said transmissions being adapted to be interconnected by means of a positively acting transmission, for synchronous operation of the two feed units.

7. A machine system as claimed in claim 1, wherein the three connecting elements between the side frames of each unit are constituted by strong tubes which have their ends connected to the side frames.

8. A machine system as claimed in claim 1, wherein the connecting elements between the side frames of each unit are arranged as supporting and guiding means for working tools adjustable transversely of the unit.

9. A machine system as claimed in claim 8, wherein said working tools are carried by a drive means on at least one of said connecting elements by the intermediary of a holder which is movable on said connecting element and adapted to be connected by nut means movably secured to the holder to a drive including a threaded spindle, a device for interconnecting the spindle and the nut means, and a servomotor preferably carried by a side frame formed as a cabinet, said servomotor having means for driving the spindle.

10. A machine system as claimed in claim 8, wherein the device for interconnecting the nut means and the threaded spindle is an air cylinder which is connected to a source of compressed air via an operating valve arrangement.

11. A machine system as claimed in claim 8, wherein said working tools are carried so as to permit raising and lowering thereof on said holder by the intermediary of a drive including a gearing adapted to be connected by means of an air cylinder and said operating valve arrangement and to be driven by means of said servomotor or handwheel and transmission.

References Cited by the Examiner

UNITED STATES PATENTS 2,028,727  1/1936  Perry et al. _____________ 29—26

WILLIAM W. DYER, Jr., *Primary Examiner.*

W. D. BRAY, *Assistant Examiner.*